United States Patent
Rajwan et al.

(10) Patent No.: US 9,535,812 B2
(45) Date of Patent: Jan. 3, 2017

(54) APPARATUS AND METHOD TO TRACK DEVICE USAGE

(71) Applicant: Intel Corporation, Santa Clara, CA (US)

(72) Inventors: Doron Rajwan, Rishon Le-Zion (IL); Nadav Shulman, Tel Mond (IL); Dorit Shapira, Atlit (IL); Kosta Luria, Pardesiya (IL); Efraim Rotem, Haifa (IL)

(73) Assignee: Intel Corporation, Santa Clara, CA (US)

( * ) Notice: Subject to any disclaimer, the term of this patent is extended or adjusted under 35 U.S.C. 154(b) by 637 days.

(21) Appl. No.: 13/930,212

(22) Filed: Jun. 28, 2013

(65) Prior Publication Data
US 2015/0006829 A1    Jan. 1, 2015

(51) Int. Cl.
G06F 11/00    (2006.01)
G06F 11/30    (2006.01)
G06F 11/34    (2006.01)

(52) U.S. Cl.
CPC ....... *G06F 11/3037* (2013.01); *G06F 11/3419* (2013.01); *G06F 11/3476* (2013.01); *G06F 2201/88* (2013.01)

(58) Field of Classification Search
CPC ............ G06F 11/3419; G06F 11/3037; G06F 11/3476; G06F 11/0709; G06F 11/0751; G06F 11/3006; G06F 11/3203; G06F 1/3203; G06F 2201/87; H04L 41/0213
See application file for complete search history.

(56) References Cited

U.S. PATENT DOCUMENTS

| 5,557,784 A | 9/1996 | Dayan et al. |
| 5,654,905 A | 8/1997 | Mulholland et al. |
| 8,984,179 B1 * | 3/2015 | Cardona ................ G06F 13/28 710/1 |
| 9,032,223 B2 * | 5/2015 | Rotem ................... G06F 1/206 713/300 |
| 2003/0120464 A1 * | 6/2003 | Taft ................... G06F 17/30899 702/186 |
| 2004/0088400 A1 * | 5/2004 | Daggett .............. G06F 11/3495 709/224 |

(Continued)

FOREIGN PATENT DOCUMENTS

WO    2009094398    7/2009

OTHER PUBLICATIONS

IpMonitor "ipMonitor 8.5 Administrators Guide", Mar. 30, 2007, SolarWinds.net, pp. 5.*

(Continued)

*Primary Examiner* — Bryce Bonzo
*Assistant Examiner* — Jeison C Arcos
(74) *Attorney, Agent, or Firm* — Trop, Pruner & Hu, P.C.

(57) ABSTRACT

In an embodiment, a processor includes measurement logic to measure a usage associated with the processor. The processor also includes statistical logic to determine, based on a statistical procedure, whether to provide a permission to record an increase in usage responsive to an indication that the usage has increased by a defined amount. The processor also includes control logic to record the defined increase in usage in non-volatile memory responsive to receipt of the permission to record from the statistical logic. Other embodiments are described and claimed.

7 Claims, 7 Drawing Sheets

(56) References Cited

U.S. PATENT DOCUMENTS

| | | | |
|---|---|---|---|
| 2005/0119846 A1 | 6/2005 | Mori | |
| 2005/0125702 A1* | 6/2005 | Huang | G06F 1/3203 713/320 |
| 2006/0112377 A1* | 5/2006 | Nacul | G06F 8/456 717/140 |
| 2006/0174228 A1* | 8/2006 | Radhakrishnan | G06F 9/30047 717/127 |
| 2006/0176824 A1* | 8/2006 | Laver | H04L 12/24 370/241 |
| 2006/0200450 A1* | 9/2006 | Keane | G06F 17/30595 |
| 2006/0217115 A1* | 9/2006 | Cassett | H04L 41/5009 455/423 |
| 2008/0147357 A1* | 6/2008 | Truter | G06F 11/3476 702/186 |
| 2008/0242952 A1* | 10/2008 | Jung | A61B 5/411 600/300 |
| 2008/0270071 A1* | 10/2008 | Marvasti | G05B 23/0221 702/179 |
| 2009/0177692 A1* | 7/2009 | Chagoly | G06F 11/0709 |
| 2009/0307509 A1* | 12/2009 | Jenne | G06F 1/3203 713/322 |
| 2010/0064162 A1* | 3/2010 | Rotem | G06F 1/206 713/340 |
| 2010/0088232 A1* | 4/2010 | Gale | G06F 19/3418 705/50 |
| 2011/0113166 A1* | 5/2011 | Hung | G06F 13/4027 710/63 |
| 2011/0154011 A1* | 6/2011 | Efraim | G06F 21/572 713/100 |
| 2012/0030515 A1* | 2/2012 | Birakoglu | G06F 11/368 714/38.1 |
| 2012/0054333 A1* | 3/2012 | Vichare | G06F 11/3438 709/224 |
| 2013/0054179 A1 | 2/2013 | Shapira | |
| 2013/0212440 A1* | 8/2013 | Rom | G06F 11/0709 714/47.1 |

OTHER PUBLICATIONS

BDTi, "QDSP6 V4: Qualcomm Gives Customers and Developers Programming Access to its DSP Core", BDTi, Jun. 22, 2012, 4 pages.

European Patent Office, Extended Search Report mailed Feb. 2, 2015, in European Patent Application No. 14173701.5.

* cited by examiner

APPARATUS AND METHOD TO TRACK DEVICE USAGE

TECHNICAL FIELD

Embodiments relate to tracking device usage.

BACKGROUND

Reliability of a processor may degrade over time. A counter may be implemented to track elapsed usage of the processor, which can be valuable in assessing continued reliability of the processor. Usage data is typically saved to storage, e.g., non-volatile memory that stores the usage data over the processor lifetime.

The processor may be powered down at any time, and the contents of the counter may be lost. If, for example, at each power down the counter value is lost, a drift in the counter value may result. For example, an average drift may be one-half of a "snapshot rate" (rate at which total usage is recorded) for every power down. In an extreme case, if the power down occurs more frequently than writes to memory, the counter will start over from zero after power up.

DETAILED DESCRIPTION

A reliability counter ("reliability odometer," "odometer") potentially with large number of bits may collect usage data associated with, e.g. processor usage. It may be desirable to track progress of this counter over a product (e.g., processor) lifetime. A "brute force" approach to maintenance of a non-volatile record of usage may capture and store a value of the counter each time a defined interval has passed (e.g. every few seconds or every defined count). This however ends up with very large number of write cycles or OTP bits. One solution to creation of a non-volatile record of processor use is through non-volatile memory, e.g., field-programmable fuses, which may be a one-time programmable (OTP) type of Non Volatile Read Only Memory (ROM) and that may be burnt directly on the processor.

For example, field programmable fuses can be burned upon each instance of the processor having reached a defined usage. For example the defined usage or "age-stress metric" may be a defined length of processor usage time, a defined number of processor cycles, a defined energy used by the processor, a defined number of executed operations, or another defined measure of processor use (e.g., reliability stress). In one example, the defined usage may be a defined number of minutes, and product lifetime may be a number of years.

More frequent snapshots can lower the odometer drift due to loss of power, but require more storage. If each instance of the processor having reached the usage quota were to result in burn of an OTP fuse, maintenance of a record the processor usage would require millions of fuses.

Through use of statistical techniques, the number of field programmable fuses needed may be significantly reduced. To reduce a total number of OTP fuses needed to track usage of the processor, the "snapshot" of the counter may be done each time a defined count is reached. For example, every time a "wrap-around" of 8 bits (256 counts) is reached, a usage record may be incremented and stored in the non-volatile (NV) memory (e.g., OTP memory such as fuses). A "lifetime count" may be determined from a stored count in NV memory plus a current counter value (e.g., 256*count in memory+current counter value).

Power down may result in loss of counter information, e.g., an average of 128 counts for the 8 bit counter. In an embodiment, an average random drift, e.g., 128 counts at each power-up, may be added to account for instances of power down, e.g., processor turned off due to operator choice, or due to loss of power).

In an embodiment, the number of writes can be reduced through use of a random probability technique. For example, a choice of a recording periodicity may be n=10 bit, which implies a memory write once in every 1024 wrap-arounds of the odometer. On average, the NV memory will be written to once per 1024 wrap-arounds, and the selection of the particular instance at which the write occurs may be determined through use of statistical (e.g., random probability) logic. The probability of writing to the NV is typically independent of which wrap-around is being considered, e.g., each wrap-around has the same probability of causing a write regardless of whether the processor was powered down before the write occurs. Use of probability to determine which one of a large number of instances of wrap-arounds of the odometer may result in a write that can reduce a total number of writes by any factor desired, and can result in replacement of a drift in the odometer value by jitter that statistically sums to zero.

Figure 1:
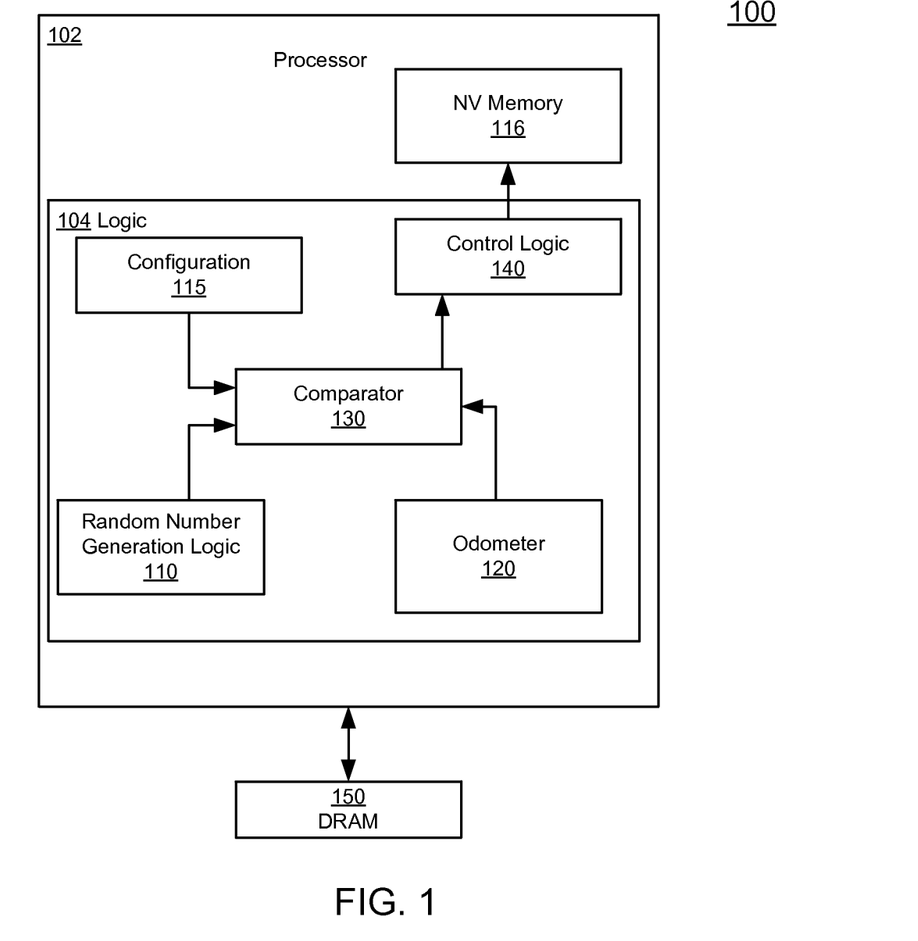
FIG. 1 is a block diagram of a system in accordance with an embodiment of the present invention.

Turning to FIG. 1, shown is a system in accordance with an embodiment of the present invention. The system 100 includes a processor 102 that is coupled to a dynamic random access memory (DRAM) 150. An odometer 120 measures usage of the processor. The processor 102 also includes logic 104, such as a statistical logic that includes a comparator 130, random number generation logic 110, configuration data 115, control logic 140 and non-volatile memory 116 (e.g. non-volatile programmable memory such as one-time programmable fuses). In other embodiments the non-volatile memory 116 may reside outside of the processor 102, such as on a separate die from the system 100, in a power control hub (not shown), in a system platform (not shown), or at another location.

In an embodiment the odometer 120 may measure an elapsed time during which the processor is powered up. In another embodiment, the odometer 120 may measure processor cycles (e.g., clock cycles) completed. In other embodiments, the odometer 120 may be associated with a measure of operations executed, or a measure of energy consumed by the processor 102, a measure of time during which the processor is active at a given operating temperature, or another measure of processor usage such as a combined measure of stress parameters during processor active use time.

In operation, the odometer 120 may indicate that a defined usage increment (U units) has been reached as a result of operation of the processor. An indication that the defined usage increment is reached may be sent to the comparator 130, and the indication may trigger the comparator 130 to perform a comparison. The comparator 130 may store a reference number R for use in the comparison.

The configuration data may indicate a value $N_1$, which is an average number of defined usage increments between successive writes to the NV memory 116. For example, the value of $N_1$ may be chosen to be as small as $N_1=2$ (recordation to the NV memory is to occur every other time that the odometer 120 indicates an incremental change of U units of usage), or as large as is desired, by initial choice of the configuration data 115. On average, one record will be written for each $N_1$ times that odometer 120 indicates the defined incremental usage U units has been reached.

The random number generation logic 110 may be used to generate a random integer number X whose value lies between 0 and ($N_1-1$). The comparator may store the reference number R that is a selected one of the $N_1$ values between 0 and ($N_1-1$), and R remains unchanged throughout a measurement lifetime of the processor 102, e.g., throughout all recording of processor usage. The value X may be compared to the stored R, and if there is a match, an indication is sent to the control logic 140 to record to the NV memory 116 (e.g., burn a fuse in the NV memory 116). If the comparison does not produce a match, the control logic 140 does not write to the NV memory 116. In various embodiments, the NV memory 116 may be readable, e.g., a stored value may be read from the NV memory 116, while the system 100 is in a powered-on state, and in some embodiments the NV memory 116 may be readable while the system 100 is in a powered-off state, In each instance of a comparison, there is an equal probability that the number X is equal to R. After $N_1$ instances of U units, corresponding to $N_1$ successive wrap-arounds of the odometer 120, on average the NV memory 116 will have been written to only once. Some of those wrap-arounds may occur after a loss of power. Use of the probabilistic determination may lessen the drift that might otherwise occur due to power shut-downs that otherwise results in loss of data previously resident in the odometer 120.

In some embodiments, the odometer 120 of FIG. 1 may be read at successive time intervals that correspond to larger than one bit increments of the odometer 120. In such embodiments, measurement of the value in the odometer 120 may indicate that overflow (MSB changes) has been reached plus a residual value in excess of a wrap-around, e.g., U+V. In order to more accurately track usage, the residual value V may be temporarily stored and returned to the odometer so that V is not lost.

Figure 2:
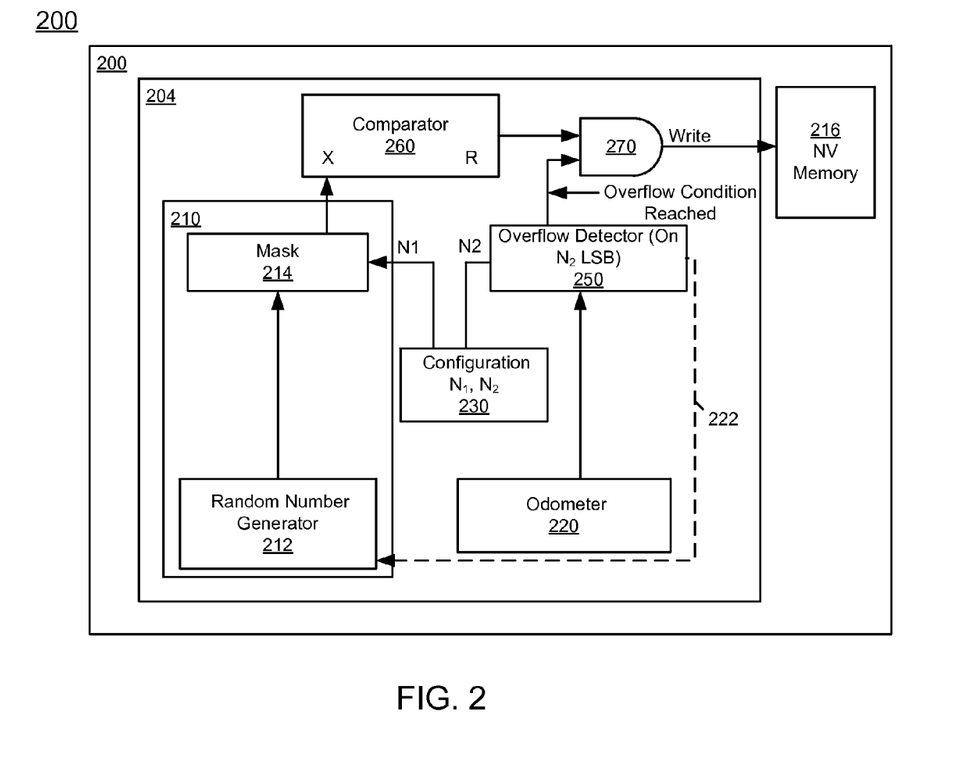
FIG. 2 is a block diagram of a processor in accordance with an embodiment of the present invention.

Turning to FIG. 2, shown is a processor 200, according to embodiments of the present invention. The processor 200 includes logic 204 and a non-volatile (NV) memory 216, e.g., programmable fuses such as one-time programmable fuses. The logic 204 is to determine whether to write an indication of processor usage to the NV memory 216.

The logic 204 includes an odometer 220 to track usage of the processor 200, and may track B bits. Configuration data 230 stores a value $N_2$, which is a number of least significant bits of the odometer 220 that wrap-around for every U units of usage of the processor 200. Each wrap-around of the $N_2$ least significant bits results in an incremental change of a most significant bit (MSB) of the odometer 220, e.g., from 0 to 1, or from 1 to 0. The change of the MSB may be detected by an overflow detector 250, which may generate an indication that an overflow condition is reached, e.g., wrap-around of the $N_2$ least significant bits of the odometer 220 corresponding to U units of processor usage.

The configuration data 230 may also include a value $N_1$ that may be used by a mask 214 of random number generation logic 210. A random number generator 212 may generate random numbers. In an embodiment, the random numbers may be generated upon receipt of an indication 222 that the overflow condition has been reached. In another embodiment, the random numbers may be generated on an ongoing basis (e.g., without the indication 222). A mask 214 may permit only the $N_1$ least significant bits of a generated random number B to be seen by a comparator 260, where the integer $N_1$ may be received from configuration registers 230. The value $N_1$ may be a count of bits that represent a total number of wrap-arounds (e.g., $2^{N_1}$ total wrap-arounds) that are associated with a single write to a NV memory. That is, for every $N_1$ wrap-arounds (of the $N_2$ least significant bits) of the odometer 220, one write NV memory is to occur. The write may occur with equal probability upon occurrence any of the wrap-arounds. The selection of which wrap-around is followed by the write may be determined by the comparator 260.

The comparator 260 stores a reference number R that may be chosen to be one of the $N_1$ values, e.g., R may be chosen to be an integer between 0 and ($N_1-1$). The choice of R may be made prior to monitoring processor usage (e.g., processor lifetime). Upon detection by the overflow detector 250 that the overflow condition is reached (e.g., wrap-around), the random number logic 210 generates a random number X that is an integer between 0 and ($N_1-1$). The comparator 260 may compare the value X to the value R stored in the comparator 260, and if there is a match, an indication of the match is sent to an AND gate 270. The presence of two positive inputs to the AND gate 270 causes a write to the NV memory. If, however, the comparison does not produce a match, then the output of the comparator 260 will be a negative input to the AND gate, and no write will occur to the NV memory. Because a match occurs, on average, once per $N_1$ instances of overflow, only one write will occur per $N_1$ wrap-arounds. Through use of the probabilistic determination of a write to NV memory, drift of the logged usage in the odometer 220 is reduced to jitter.

In some embodiments, the odometer 220 of FIG. 2 may be tracked (e.g., measured) at successive time intervals that correspond to larger than one bit increments of the odometer 220. In such embodiments, measurement of the value in the odometer 220 may indicate that overflow (indicated by a change in MSB) has been reached (U units), and additionally a residual value V in excess of a wrap-around is logged. In order to more accurately track usage, the residual value V may be temporarily stored and returned to the odometer for the next successive measurement.

Figure 3:
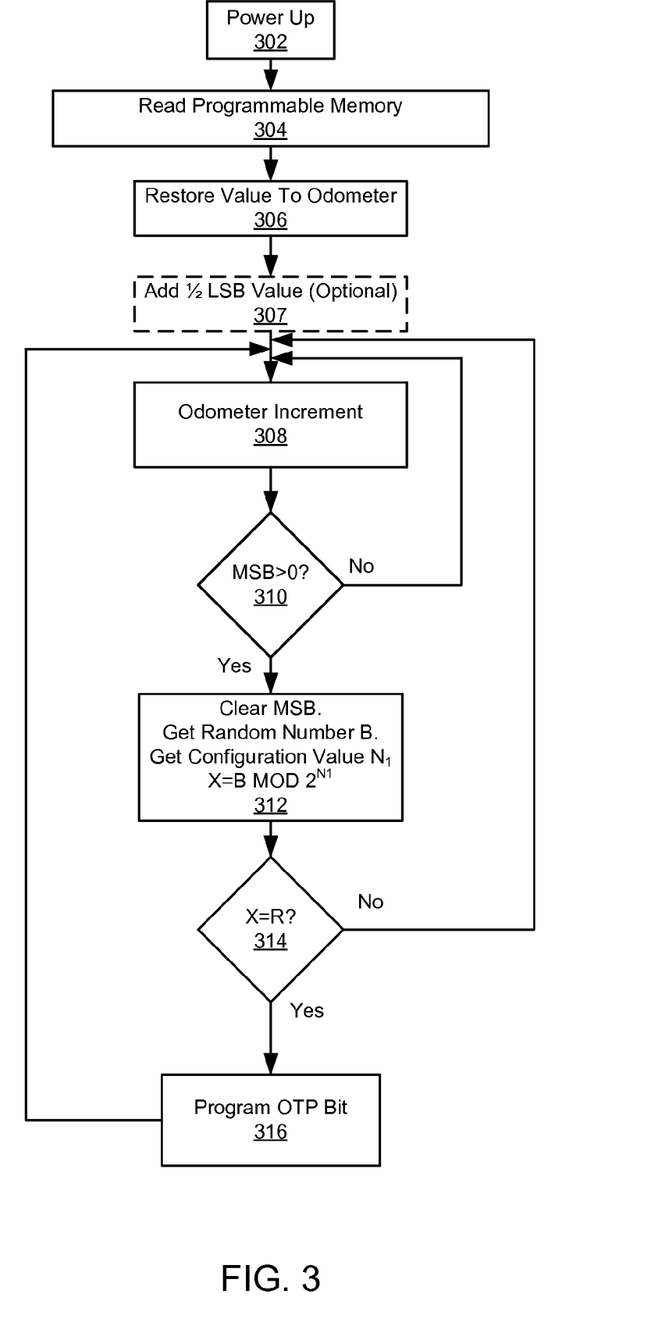
FIG. 3 is a flow diagram of a method in accordance with an embodiment of the present invention.

Turning to FIG. 3, shown is a flowchart of a method performed by logic of a processor, according to embodiments of the present invention. At block 302, a system including the processor may be powered up. Continuing to block 304, a programmable (OTP) memory that stores usage data associated with the processor may be read. Advancing to block 306, most significant bits (MSB) may be restored to a usage odometer associated with the processor, from, e.g., a power management unit. For example, in an embodiment the usage odometer stores operation time of the processor in hours and minutes. The number of hours previously indicated on the usage odometer prior to a power down may be restored to the usage odometer from a register in the power management unit. (In another embodiment, the usage odometer may store a measure of processor cycles, or energy expended in time, or another measure of processor usage).

Advancing to block 307, optionally an additional amount of one-half of a least significant bits value (e.g., one half of a "wrap-around" amount) may be added to the odometer reading to account for drift due to loss of least significant bits accrued since a previous wrap-around, which may have been lost due to a power-down. For example, if the usage odometer measures operation time of the processor and the wrap-around occurs every 64 minutes ($=2^6$ minutes, which is approximately 1 hour), then 32 minutes ($=2^5$) may be added to offset drift to account for an average value of elapsed time that may have accrued in the odometer and that may have been lost due to a most recent power down.

Moving to block 308, the usage odometer may increment with processor usage. For example, the usage odometer may log minutes of operational time, processor cycles executed, cumulative energy used by the processor over time, or another measure of processor usage. Proceeding to decision block 310, if a next most significant bit MSB, e.g., a next bit greater than a set of Least Significant Bits (LSB), is not incremented (e.g., a wrap-around has not occurred), the method returns to block 308. At decision block 310, if the next MSB increments (e.g., due to a wrap-around of the odometer LSB set), the method continues to block 312. For example, a wrap-around may occur when each of LSB bits $2^0, 2^1, 2^2, 2^3, 2^4$, and $2^5$ advances to a value of zero and the $2^6$ bit increments. For example, if the usage odometer is measuring operational time, the increase in the $2^6$ bit may indicate that 64 minutes have accrued since a previous wrap-around.

At block 312, the MSB may be cleared, and a probabilistic technique may be invoked to determine whether to record the wrap-around event in a non-volatile memory (e.g., a onetime programmable memory such as a bank of fuses). For example, a random number N may be received from, e.g., a random number generator. A configuration value $N_1$ may be retrieved from a configuration register. For example, $N_1$ may indicate an average number of wrap-arounds that are associated with a single entry in the NV memory (e.g., OTP memory).

A test number X may be determined from $X=B \bmod 2^{N_1}$, which may be equivalent to masking some bits of a random number B. The test number X may be compared with a reference value R that has a fixed integer value selected in a range 0 to $(N_1-1)$. Due to random number generation, on average the test number X will be equal to R only once per $N_1$ instances of test number X.

Moving to decision block 314, if X=R, an OTP memory bit (e.g., fuse) may be programmed (e.g., burned) in the OTP memory. If X is not equal to R, the method return to block 308, where the odometer continues to increment to reflect processor usage.

Through use of the probabilistic technique described above, a total number of OTP bits in the OTP memory needed to record processor usage may be reduced because a frequency of writes to the OTP memory can be reduced to once per $N_1$ wrap-arounds of the usage odometer. The probabilistic technique can also reduce a drift that might otherwise be due to loss of recorded usage as a result of power downs/power outages. The drift may be reduced to a jitter in recorded usage by averaging usage loss over a number of wrap-arounds.

Figure 4:
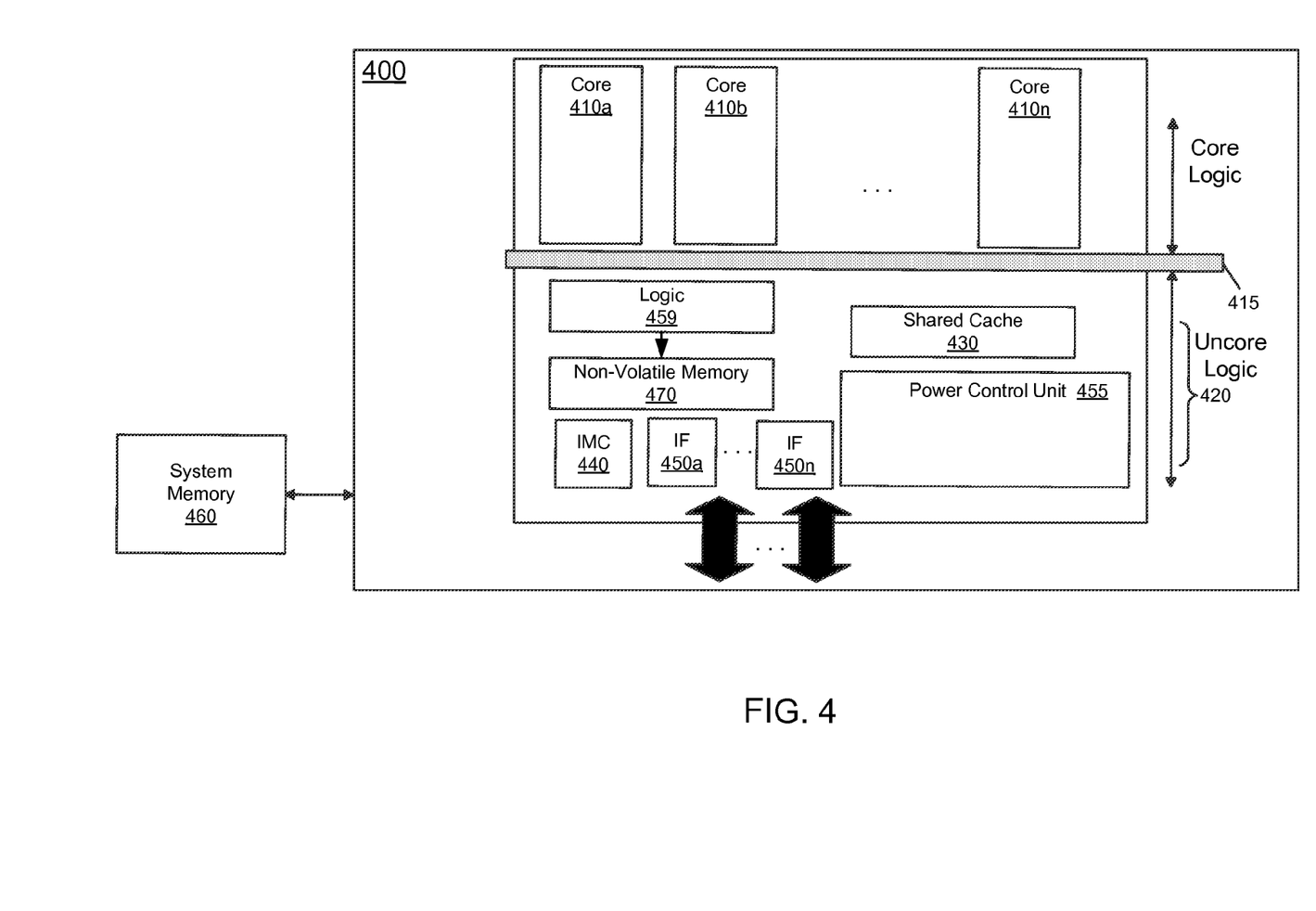
FIG. 4 is a block diagram of a processor in accordance with an embodiment of the present invention.

Referring now to FIG. 4, shown is a block diagram of a processor in accordance with an embodiment of the present invention. As shown in FIG. 4, processor 400 may be a multicore processor including a plurality of cores $410_a$-$410_n$.

The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455.

In various embodiments, the processor 400 may include a logic 459, (e.g., a statistical logic) to record processor usage and non-volatile memory 470 in which the processor usage may be recorded, in accordance with embodiments of the present invention. In various embodiments, the logic 459 may count usage of one or more functional blocks of the processor 400, e.g., at a first rate for a single core such as the core 410a, or at a second rate associated with two cores such as the cores 410a and 410b, etc., according to embodiments of the present invention. In other embodiments, the logic 459 may count usage of one or more cores in various states of activity, e.g., various P-states or C-states, according to embodiments of the present invention. In yet other embodiments, the logic 459 may count usage of one or more cores at a particular voltage of operation, frequency of operation, temperature, or other operating parameter, according to embodiments of the present invention.

With further reference to FIG. 4, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
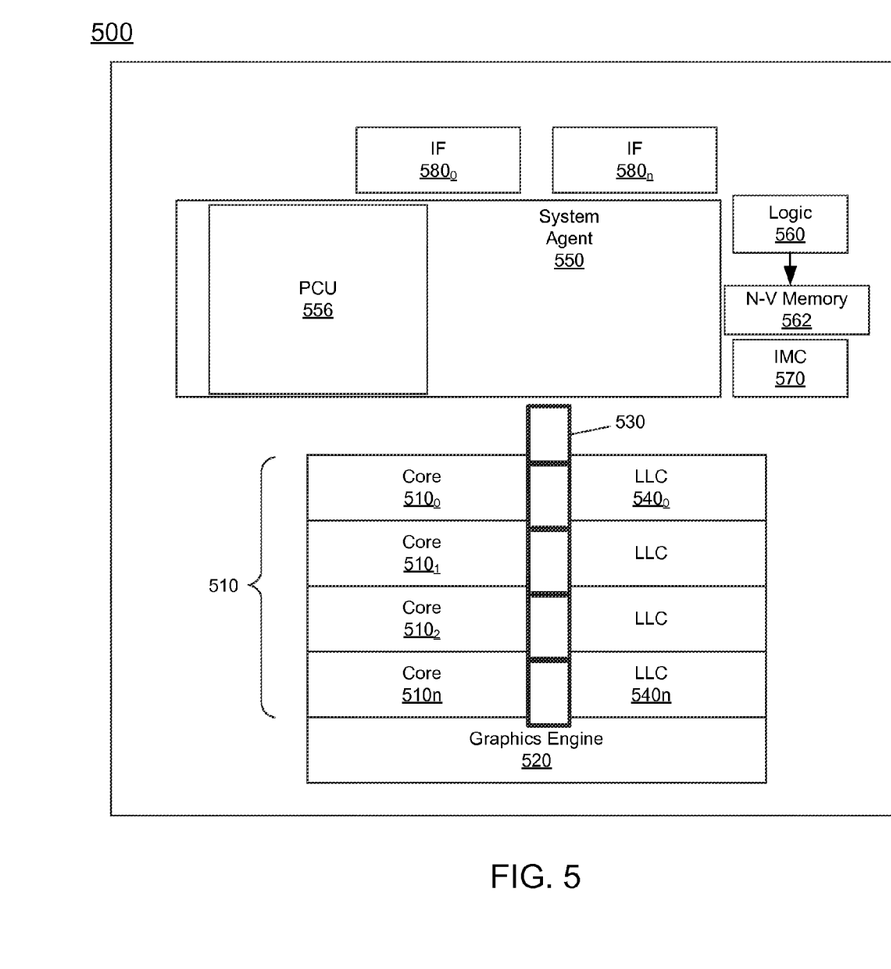
FIG. 5 is a block diagram of a processor in accordance with one embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores $510_0$-$510_n$, a graphics domain 520 can include one or more graphics engines, and a system agent domain 550 may further be present. Note that additional domains can be present in other embodiments. For example, multiple core domains may be present each including at least one core.

In general, each core 510 may further include low level caches in addition to various execution units and additional processing elements. The various cores may be coupled to each other and to a shared cache memory formed of a plurality of units of a lower level cache (LLC) $540_0$-$540_n$. In various embodiments, LLC $540_0$-$540_n$ may be shared amongst the cores and the graphics engine, as well as various media processing circuitry. As seen, a ring interconnect 530 couples the cores together, and provides interconnection between the cores, graphics domain 520 and system agent circuitry 550.

As further seen, system agent domain 550 may include a power control unit (PCU) 556 to perform power management operations for the processor. As further seen in FIG. 5, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with the QPI™ protocol may also be provided.

Although shown at this high level in the embodiment of FIG. 5, understand the scope of the present invention is not limited in this regard.

The processor 500 includes logic 560 to determine whether to record processor usage or activity of any of the domains (e.g., the core domain 510, the graphics domain 520, the system agent domain 550, additional domains) in a non-volatile memory 562, according to embodiments of the present invention.

As further seen in FIG. 5, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with the QPI™ protocol may also be provided. Although shown at this high level in the embodiment of FIG. 5, understand the scope of the present invention is not limited in this regard.

Figure 6:
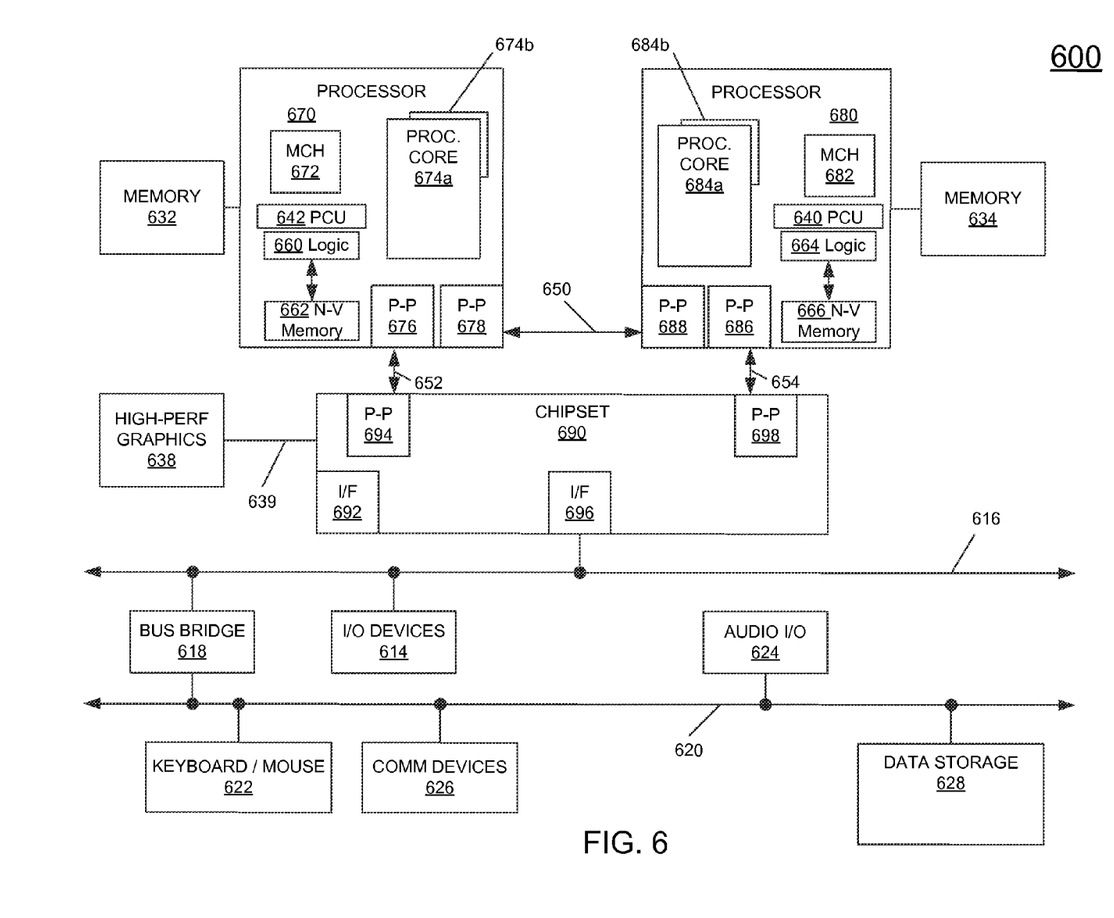
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Processor 670 may include a power control unit 642, and processor 680 may include a power control unit 640.

Processor 670 may include logic 660 to record processor usage of the processor 670 to a nonvolatile memory 662, as described herein according to embodiments of the present invention. Processor 680 may include logic 664 to record processor usage of the processor 680 to a nonvolatile memory 666, as described herein according to embodiments of the present invention.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCHs 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 6, various input/output (I/O) devices 614 may be coupled to first bus 616, along with a bus bridge 618 that couples first bus 616 to a second bus 620. Various devices may be coupled to second bus 620 including, for example, a keyboard/mouse 622, communication devices 626 and a data storage unit 628 such as a disk drive or other mass storage device. Further, an audio I/O 624 may be coupled to the second bus 620. Embodiments can be incorporated into other types of systems including mobile devices such as a smart cellular telephone, tablet computer, netbook, or so forth.

Figure 7:
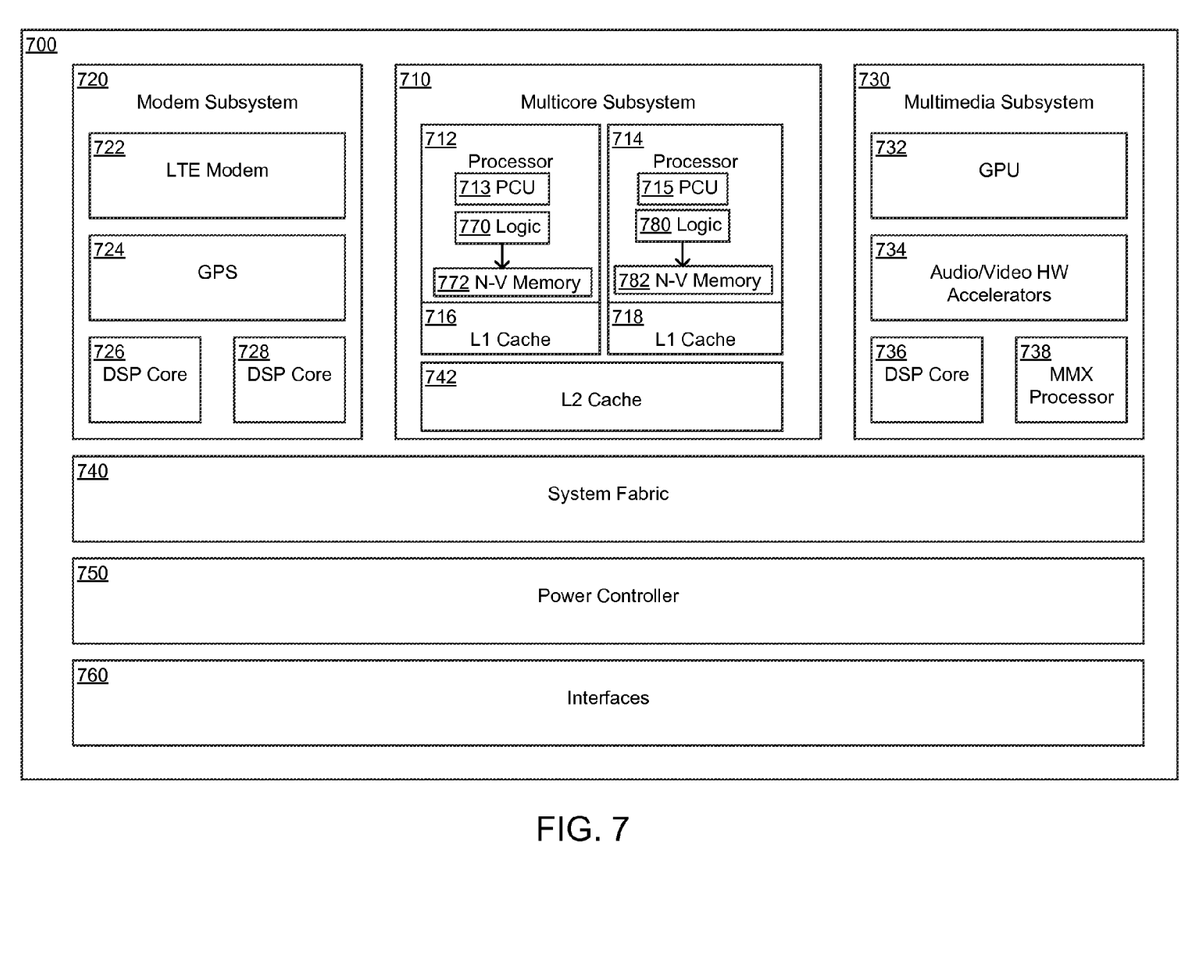
FIG. 7 is a block diagram of a system on a chip (SOC), in accordance with an embodiment of the present invention.

FIG. 7 is a block diagram of a system on a chip (SOC) in accordance with embodiments of the present invention. The SOC 700 includes a multicore subsystem 710, a modem subsystem 720, a multimedia subsystem 730, system fabric 740, a power controller 750, and interfaces 760 to interface with one or more external devices. The SOC 700 may perform multiple tasks concurrently, e.g., modem tasks, multimedia tasks, and other processing tasks.

The multicore subsystem 710 includes multicore processors 712 and 714, L1 caches 716 and 718, and L2 cache 742. Each of the multicore processors 712 and 714 may include a corresponding power control unit (PCU) 713 and 715.

Processor 712 may include logic 770 to record processor usage of the processor 712 to a nonvolatile memory 772, as described herein according to embodiments of the present invention. Processor 714 may include logic 780 to record processor usage of the processor 714 to a nonvolatile memory 782, as described herein according to embodiments of the present invention.

The modem subsystem 720 may include a Long Term Evolution (LTE) modem 722 for wireless communication of high speed data. The modem subsystem 720 may also include a global positioning system (GPS) 724, and at least two digital signal processor (DSP) cores 726 and 728.

The multimedia subsystem 730 may include a graphics processing unit (GPU) 732, audio/video hardware accelerators 734, a digital signal processing core 736, and an MMX processor 738, which may be capable of processing, e.g., single instruction, multiple data (SIMD) instructions.

The following pertains to examples of other embodiments.

In a first example, a processor includes measurement logic to measure a usage associated with the processor, statistical logic to determine, based on a statistical procedure, whether to provide a permission to record an increase in usage responsive to an indication that the usage has increased by a defined amount, and control logic to record an increase in usage by the define amount in non-volatile memory responsive to receipt of the permission to record from the statistical logic. In an embodiment, the processor includes the non-volatile memory to store each instance of a plurality of successive instances that the usage has increased by the defined amount. In another embodiment, the processor may access the non-volatile memory located separately from the processor. The non-volatile memory may include programmable fuses. In an embodiment, the non-volatile memory may be read while the processor is powered-off. In an embodiment, the non-volatile memory may be read while the processor is powered-on. In an embodiment, the statistical logic is to determine whether to provide the permission to record the increase in usage based on a comparison of a test number that is randomly selected from a pool including a set of defined numbers, to a reference number. In an embodiment, the statistical logic is to select one of the defined numbers in the pool as the reference number. In an embodiment, the statistical logic is to repeat the determination for each successive instance of receipt of the indication that the usage has increased by the defined amount, and wherein the reference number remains a same value in each successive determination. In an embodiment, a count of numbers in the pool is determined from first configuration data stored in the processor. In an embodiment, the defined amount is determined from second configuration data stored in the processor. In an embodiment, the usage is associated with a number of cycles of the processor executed since an initial time. In another embodiment, the usage is associated with an energy consumed by the processor since an initial time.

In a second example, a system includes a processor. The processor includes statistical logic to send a first indication to control logic to record an increase in processor usage responsive to a second indication that the processor usage has increased by a defined amount and to a match of a reference number to a test number selected by a random selection process from a defined pool of numbers. The processor also includes the control logic to record the increase in the usage in non-volatile memory responsive receipt of the indication to record. The system also includes dynamic random access memory coupled to the processor. In an embodiment, the processor also includes measurement logic to provide the indication that the processor usage has increased by the defined amount. In an embodiment, processor usage is associated with a total count of processor clock cycles executed by the processor beginning at a start point. In an embodiment, the non-volatile memory includes a plurality of programmable fuses. In an embodiment, the random selection process includes selection of a test number from a pool of numbers and comparison to a reference number, and where the reference number is set equal to one of the numbers of the pool. In an embodiment, a count of the numbers in the pool of numbers is associated with a frequency of recordation of the processor usage.

In a third example, at least one computer readable storage medium has instructions stored thereon for causing a system to determine whether a processor usage associated with a processor has increased by a defined amount, determine whether a test number procured via a statistical procedure matches a reference number, and responsive to a match of the test number and the reference number and to the determination that the processor usage has increased by the defined amount, to record an increase in the processor usage in non-volatile memory. In an embodiment, the instructions to determine whether the test number matches the reference number includes instructions to set the reference number equal to a selected number of a defined pool of numbers, perform a random selection of the test number from the defined pool of numbers, and compare the reference number to the test number. In an embodiment, the at least one computer readable storage medium further includes instructions to, for each successive time that it is determined that the processor usage has increased by the defined amount, determine whether a corresponding test number procured via the random selection matches the reference number and if so, to record the increase by the defined amount in the non-volatile memory. In an embodiment, the at least one computer readable storage medium further includes instructions to read the non-volatile memory while the processor is in a powered-down state or in a powered-up state. In an embodiment, the at least one computer readable storage medium further includes instructions to, responsive to a determination that the processor usage has increased by an amount that exceeds the defined amount, store an incremental value corresponding to an incremental amount by which the amount exceeds the defined amount, reset a counter that determines the processor usage, and after the counter is reset, add the incremental value to the counter.

In a fourth example, a method includes determining whether a processor usage associated with a processor has increased by a defined amount, determining whether a test number procured via a statistical procedure matches a reference number, and responsive to a match of the test number and the reference number and to the determination that the processor usage has increased by the defined amount, recording an increase in the processor usage in non-volatile memory. In an embodiment, determining whether the test number matches the reference number includes setting the reference number equal to a selected number of a defined pool of numbers, performing a random selection of the test number from the defined pool of numbers, and comparing the reference number to the test number. In an embodiment, the method includes, for each successive time that it is determined that the processor usage has increased by the defined amount, determining whether a corresponding test number procured via the statistical procedure matches the reference number and if so, recording the increase by the defined amount in the non-volatile memory. In an embodiment, the method includes reading contents of the non-volatile memory while the processor is in a powered-down state. In an embodiment, the method includes reading contents of the non-volatile memory while the processor is in a powered-up state. In an embodiment, the method includes, responsive to a determination that the processor usage has increased by an amount that exceeds the defined amount, storing an incremental value corresponding to an incremental amount by which the amount exceeds the defined amount, resetting a counter that determines the processor usage, and adding the incremental value to the counter after resetting the counter.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a processor comprising:
statistical logic to send a first indication to control logic to record an increase in processor usage corresponding to an elapsed time of processor operation, responsive to:
a second indication that the processor usage has increased by a defined amount; and
a match of a reference number to a test number selected by a random selection process from a defined pool of numbers, wherein the random selection process comprises selection of a test number from the pool of numbers and comparison to a reference number, wherein the reference number is set equal to one of the numbers of the pool and a count of the numbers in the pool is associated with a frequency of recordation of the processor usage in a non-volatile memory of the processor;
the control logic to record the increase in the usage in the non-volatile memory of the processor responsive receipt of the first indication to record; and dynamic random access memory coupled to the processor.

2. The system of claim 1, wherein the processor further comprises measurement logic to provide the second indication that the processor usage has increased by the defined amount.

3. The system of claim 1, wherein the processor usage is associated with a total count of processor clock cycles executed by the processor beginning at a start point.

4. The system of claim 1, wherein the non-volatile memory comprises a plurality of programmable fuses.

5. At least one non-transitory computer readable storage medium having instructions stored thereon for causing a system to:
determine whether a processor usage associated with a processor has increased by a defined amount;
responsive to a determination that the processor usage has increased by an amount that exceeds the defined amount, store an incremental value corresponding to an incremental amount by which the amount exceeds the defined amount, reset a counter that determines the processor usage, and after the counter is reset add the incremental value to the counter;
determine whether a test number procured via a statistical procedure matches a reference number; and
responsive to a match of the test number and the reference number and to the determination that the processor usage has increased by the defined amount, record an increase in the processor usage in non-volatile memory.

6. The at least one non-transitory computer readable storage medium of claim 5, wherein the instructions to determine whether the test number matches the reference number includes instructions to:
set the reference number equal to a selected number of a defined pool of numbers;
perform a random selection of the test number from the defined pool of numbers; and
compare the reference number to the test number.

7. The at least one non-transitory computer readable storage medium of claim 6, further comprising instructions to, for each successive time that it is determined that the processor usage has increased by the defined amount, determine whether a corresponding test number procured via the random selection matches the reference number and if so, to record the increase by the defined amount in the non-volatile memory.

* * * * *